United States Patent [19]

Penner

[11] Patent Number: 4,905,001
[45] Date of Patent: Feb. 27, 1990

[54] HAND-HELD FINGER MOVEMENT ACTUATED COMMUNICATION DEVICES AND SYSTEMS EMPLOYING SUCH DEVICES

[76] Inventor: Henry C. Penner, 3320 Bardstown Rd., #105, Louisville, Ky. 40218

[21] Appl. No.: 105,597

[22] Filed: Oct. 8, 1987

[51] Int. Cl.$^4$ ............................................. G06F 3/02
[52] U.S. Cl. ..................................... 341/20; 341/21; 340/407; 434/114
[58] Field of Search ................ 340/365 R, 365 S, 407, 340/825.19; 400/87, 88; 434/112, 113, 114; 341/20, 21, 22, 26

[56] References Cited

U.S. PATENT DOCUMENTS

| | | |
|---|---|---|
| 2,972,140 | 2/1961 | Hirsch . |
| 3,022,878 | 2/1962 | Seibel et al. .................... 340/365 R |
| 3,831,296 | 8/1974 | Hagle ................... 340/407 |
| 3,925,779 | 12/1975 | Gerstenhaber ...................... 340/337 |
| 3,976,995 | 8/1976 | Sebestyen ............................. 340/337 |
| 4,074,444 | 2/1978 | Laenger, Sr. et al. ......... 340/365 R |
| 4,075,621 | 2/1978 | Salmon ................................. 340/337 |
| 4,241,521 | 12/1980 | Dufresne ..................... 434/112 |
| 4,414,537 | 11/1983 | Grimes .................... 340/365 S |
| 4,458,238 | 7/1984 | Learn ........................ 340/365 |
| 4,467,321 | 8/1984 | Volnak . |
| 4,516,939 | 5/1985 | Crimmins, Jr. . |
| 4,517,424 | 5/1985 | Kroczynski . |

FOREIGN PATENT DOCUMENTS

| | | |
|---|---|---|
| 8603870 | 7/1986 | PCT Int'l Appl. . |
| 1475886 | 6/1977 | United Kingdom . |

Primary Examiner—David K. Moore
Assistant Examiner—M. Fatahiyar
Attorney, Agent, or Firm—Kerkam, Stowell, Kondracki & Clarke

[57] ABSTRACT

Disclosed are various forms of hand-held communication devices which serve as alternatives to a keyboard and which, in addition, allow the user to receive communications via the sense of touch. Although not so limited, the device is well-adapted for use by persons who are speechless, deaf and speechless, or even blind, deaf and speechless. The present invention provides particularly compact and efficient finger movement actuated communication devices for individually responding to thrust and push motions of at least one finger of a person's hand. Thus, each finger can operate two switch elements, and the four fingers of a person's hand can operate eight switch elements in predetermined combinations suitable, for example, for communication in a binary code. In a first disclosed embodiment, a handle-like body supports eight switch actuators arranged as four pairs, with each of the pairs corresponding to a particular finger. The two switch actuators are positioned for selective activation by distal and proximal segments of a single finger. In a second disclosed embodiment, four switch actuators are provided for actuation by the fleshly portions of a person's fingertips. Each of the switch actuators supports two distinct types of movement, pushing and sliding, and correspondingly operate a pair of switch elements. In a third disclosed embodiment, collar-like rings are worn about the proximal and middle segments of the user's hand. Relative motion between the collar-like rings and a wrist harnass is sensed in order to respond to thrust and push motions of the fingers.

5 Claims, 11 Drawing Sheets

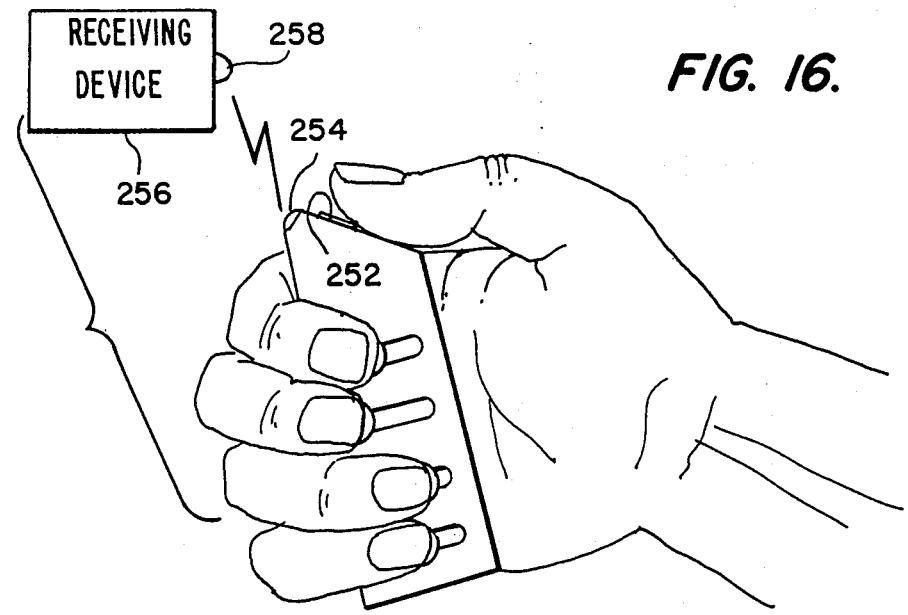
FIG. 16.
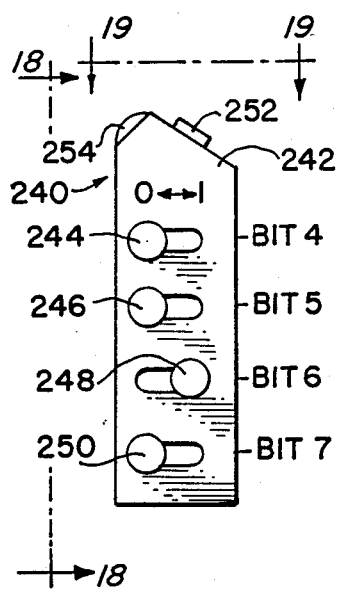
FIG. 17.
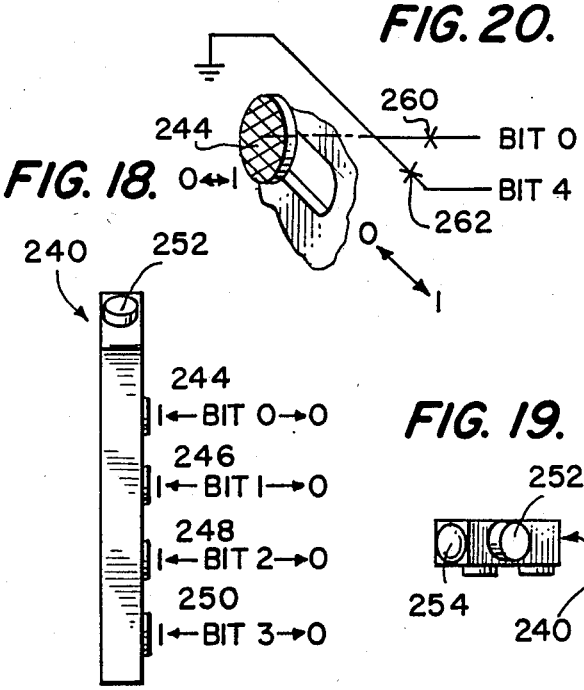
FIG. 20.
FIG. 18.
FIG. 19.
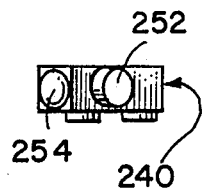

HAND-HELD FINGER MOVEMENT ACTUATED COMMUNICATION DEVICES AND SYSTEMS EMPLOYING SUCH DEVICES

CROSS-REFERENCE TO RELATED APPLICATION

Part of the subject matter disclosed herein is disclosed in my earlier U.S. Pat. application Ser. No. 682,945, filed Dec. 18, 1984, and now abandoned. Part of this subject matter may also be disclosed in my Disclosure Document No. 130250, dated Aug. 22, 1984.

BACKGROUND OF THE INVENTION

The present invention relates to various forms of finger movement actuated communications devices, particularly hand-held communication devices, suitable for both one-way communication in the manner of a keyboard, and two-way communication where the user in addition receives communications via the sense of touch. Embodiments of the invention are particularly adapted for use by persons who are speechless, deaf and speechless, or even blind, deaf and speechless.

Some embodiments of the invention are useful in hostile environments, such as where the user must wear gloves.

Keyboards are communication devices or, more correctly, human-to-machine interface devices, used in numerous situations. In addition to typewriters, keyboards are commonly employed to communicate to computers, word processors, and to remote locations. A keyboard is intended to be operated by touch alone; a skilled operator need not look at the keyboard to operate it.

While conventional keyboards serve their purpose quite well in many applications, they are not without drawbacks and limitations. Significant limitations of conventional keyboards are their size and the need to employ two hands for conventional touch typing at any reasonable speed. There are currently available portable, so-called "lap" computers whose size appears to be primarily limited by the minimum size required to support a standard keyboard and a display window, such as a liquid crystal display.

Thus, various alternatives have previously been proposed. For example, Kroczynski U.S. Pat. No. 4,517,424 discloses a hand-secured pushbutton control device which has pushbuttons at various positions and responsive to various finger movements for performing various control functions.

As another example, Learn U.S. Pat. No. 4,458,238 discloses a hand-held data entry unit including a handle with four pushbutton switches respectively corresponding to four rows of an attached matrix type display which is scanned during operation and visually observed by the user. Thumb switches are also included which act as "shift" keys.

In the particular context of devices for aiding handicapped persons, a variety of communication devices have been proposed and employed. Thus, an example of what is termed a matrix communicator is disclosed in Dufresne U.S. Pat. No. 4,241,521. Typical examples of hand-held devices for such purposes are disclosed in Salmon U.S. Pat. No. 4,075,621; Gerstenhaber U.S. Pat. No. 3,925,779, and Whittlestone et al U.K. Pat. No. 1,475,886.

Related devices for two-way communication have also been proposed. For example, Crimmins, Jr. U.S. Pat. No. 4,516,939 discloses a device having finger pushbutton switches with solenoids connected for moving the button to demonstrate particular sequences to a person. Hirsch U.S. Pat. No. 2,972,140 discloses a pushbutton communication device in which pushbutton keys have vibrators to provide tactile stimulation.

The present invention provides a particularly compact finger movement actuated communication device which effectively responds to push and thrust motions of the fingers of a user's hand, referenced to the metacarpal portion of the user's hand. As described hereinbelow with reference to FIG. 1, push motions of a finger may be viewed as reflecting a distal function, and thrust motions may be viewed as reflecting a proximal function.

SUMMARY OF THE INVENTION

Accordingly, it is an object of the invention to provide an improved keyboard device.

It is another object of the invention to provide a keyboard device which is extremely small and which can be held in and operated by one hand.

It is another object of the invention to provide such a device which facilitates two-way communication.

It is another object of the invention to provide such a device which is capable of communication in conventional 8-bit or 16-bit binary codes, for example the ASCII code.

It is still another object of the invention to provide such a device which does not interfere with grasping use of the hand, and which can be worn inside a glove.

Briefly, the present invention provides particularly compact and efficient finger movement actuated communication devices for individually responding to thrust and push motions of at least one finger of a person's hand. Thus, each finger can operate two switch elements, and the four fingers of a person's hand can operate eight switch elements in predetermined combinations suitable, for example, for communication in a binary code.

While these two distinct motions are usually thought of as both operating on the fingertip, in accordance with the present invention these embodiments are sensed in a manner which decreases the amount of operator skill required.

In a first overall embodiment of the invention, a handle-like body is provided having a suitably contoured portion around which the proximal, middle and distal (all with reference to the point of attachment of the finger to the hand) segments of the fingers of a person's hand can curve such that the contoured portion is enclosed with the person's hand. A plurality of switch actuators are carried by the body for selective manual activation singly or in predetermined combinations. At least one pair of the switch actuators is positioned on the enclosed portion of the hand for respective selective activation by fleshy portions of the distal and proximal segments of the single finger.

In a preferred form, eight switch actuators arranged as four pairs are provided, and each of the pairs corresponds to a particular finger. The actuators can be operated in predetermined combinations to generate representations in a binary code, such as ASCII, which is directly understood by computers, various forms of terminal equipment, and printers. With this arrangement, 256 different combinations or patterns (including the pattern of no switches) can be selected, providing a full eight binary bits. It is advantageous to also provide a ninth switch actuator positioned for activation by the thumb, with this ninth switch actuator serving to provide a "strobe" signal indicating to the equipment to which the hand-held device is connected that a combination of switches has been selected and is at that moment valid.

For enabling communication to the operator, a plurality of selectively controlled stimulation elements, such as vibrators, are provided and connected to corresponding ones of the switch actuators. Two-way communication is thus facilitated.

As an alternative, rather than simple two position switches, multiple level or position switches can be employed, allowing a great many more bit positions to be generated with one hand.

The first embodiment of the invention may also be provided with means for receiving attachments, such as an amplifying projector or a display screen. The attachment-receiving means include a fastening element, such as a groove of dovetail cross section, and includes an optical transceiver with base unit optical transmitter and receiver elements connected respectively to transmit signals from the switch actuators and to operate the tactile stimulation elements in response to received signals. The amplifying projector attachment includes optical receiver and transmitter elements respectively optically coupled to the base unit optical transmitter and receiver elements when attached, and the display screen includes an optical receiver element optically coupled to the base unit optical transmitter element for receiving representations of character to be displayed.

A second overall embodiment of the invention takes the form of a relatively flat hand held body, shaped somewhat like a credit card, but thicker. The body has a control surface positioned so as to be contacted by the fleshy portions of a person's fingertips, such that the fingers of a person's hand can curve around the body to restrain the body between the fingers and the palm of a hand. A plurality of switch actuators are located on the control surface for fingertip actuation. Each of the switch actuators supports two distinct types of movement and correspondingly operates a pair of switch elements. One of the switch elements is responsive to a pushing motion of the actuator so as to respond to a pushing motion of the finger, and the other of the switch elements is responsive to a sliding motion of the actuator so as to respond to a thrust motion of the finger. Thus, the switch elements can be activated in predetermined combinations.

In a preferred form, four switch actuators are included such that the person can operate eight switch elements with one hand in predetermined combinations.

A third overall embodiment of the invention advantageously is worn on the hand in a manner loosely analogous to a glove, and presents minimal interference to ordinary use of the hand. Advantageously, the third embodiment may even be worn inside a glove. Although it does not employ pushbuttons, this third embodiment is like the other embodiments in that it responds to both thrust (proximal function) and push (distal function) motions of the fingers, referenced to the metacarpal portion of the user's hand.

More particularly, the third embodiment of the invention includes a metacarpal reference member adapted to be secured to the back of the hand, in the form of a wrist harnass somewhat like archers use. As in the previous embodiments, the device is individually responsive to thrust and push motions of at least one finger of the person's hand, and preferably all four. Additionally included is a first collar-like attachment member adapted to be secured to the proximal segment of the one finger so as to follow motion of the proximal segment, and a second collar-like attachment member adapted to be secured to a segment of the one finger beyond the proximal segment, preferably to the middle segment, so as to follow motion of the middle segment of the one finger. Corresponding first and second collar-like attachment members are secured to the proximal and middle segments of the other fingers. The fingertips and thumb are left free, enabling users to wear the device at any time without causing any more interference than ordinary rings.

In order to respond to thrust motions (proximal function) and push motions (distal function), first and second sensing assemblies are generally provided respectively coupled to the metacarpal reference member and the first attachment member for detecting relative motion therebetween as the proximal finger segment pivotally moves with reference to the metacarpal portion of the hand in a thrust motion, and coupled to the first and second attachment members for detecting relative motion therebetween as the middle finger segment pivotally moves with reference to the proximal finger segment in a push motion. The first and second sensing assemblies include respective switch elements each having two states. The first switch element is in one of its states when the metacarpal reference and first attachment members are in one position with respect to each other, and in the other of its states when the metacarpal reference and first attachment members are in another position with respect to each other. In similar fashion, the second switch element is in one of its states when the first and second attachment members are in one position with respect to each other, and in the other of its states when the first and second attachment members are in another position with respect to each other. As a result, the first switch element responds to thrust motions of the finger and said second switch element responds to push motions of the finger.

Various forms of sensing assembly may be employed for detecting relative motion or movement. For example, electromagnetic coupling may be employed.

In a specific embodiment disclosed in detail herein, mechanically-coupled sensing assemblies are employed. More particularly, in order to respond to thrust motions (proximal function), a first extendable switch assembly is provided mechanically linking the metacarpal reference member and the first collar-like attachment member such that the first extendable switch assembly lengthens and shortens as the proximal finger segment pivotally moves with reference to the metacarpal portion of the hand. The first extendable switch assembly includes a first switch element having two states. The first switch element is in one of its states when the first extendable switch assembly is lengthened, and is in the other of its states when the first extendable switch assembly is shortened.

To respond to push motions of the finger (distal function), a second extendable switch assembly is provided, mechanically linking the first and second collar-like attachment members such that the second extendable switch assembly lengthens and shortens as the middle finger segment pivotally moves with reference to the proximal segment. The second switch assembly likewise includes a second switch element having two states.

The second switch element is in one of its states when the second extendable switch assembly is lengthened, and in the other of its states when the second extendable switch assembly is shortened.

Preferably, four sets of first and second collar-like attachment members and first and second extendable switch assemblies are provided, one set for each finger, thereby providing eight switches which can be selectively operated by one hand in predetermined combinations.

In order to provide a thumb switch, the one of the second collar-like attachment embers adapt to be secured to a segment of the first finger of the person's hand carries a switch activator positioned for activation by the thumb.

To provide for two-way communication to the user, the device includes selectively controlled tactile stimulation elements, such as vibrators, within the collar-like attachment members.

BRIEF DESCRIPTION OF THE DRAWINGS

While the novel features of the invention are set forth with particularity in the appended claims, the invention, both as to organization and content, will be better understood and appreciated, along with other object and features thereof, from the following detailed description, taken in conjunction with the drawings, in which:

FIG. 16 is a perspective view of a second embodiment in accordance with the invention;

FIG. 17 is a side view of the FIG. 16 device;

FIG. 18 is a front edge view of the device, taken generally along line 18—18 of FIG. 17;

FIG. 19 is a top view of the device, taken generally along line 19—19 of FIG. 17;

FIG. 20 is a representation of two forms of switch motion employed in the device of FIGS. 16-19;

DETAILED DESCRIPTION

Figure 1:
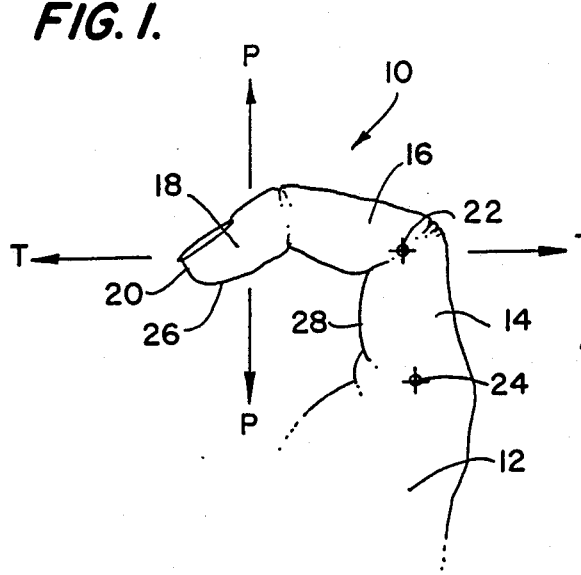
FIG. 1 is a diagrammatic view of a person's hand and a finger, depicting forms of motion employed in accordance with the invention.

Referring at the outset to FIG. 1, depicted for definitional purposes is a single finger of a person's hand, the finger being capable of several forms of motion.

Preliminarily, it may be noted that the human hand has several functions. A basic function is the grasping function, whereby the hand applies all elements and its opposing thumb in a unified manner to apply pressure and thereby control an object. A second function is to apply pressure or motion to each individual finger or thumb, thereby defining independent operating elements, such as in playing a piano or typing on a conventional keyboard.

In accordance with the invention, it is appreciated that the hand may be assigned another function, namely, a digital communication function, involving nine elements comprising the fingers and thumb, with all nine elements functioning independently of one another. Each finger defines two elements of the digital communication function.

With more particular reference to FIG. 1, the hand 10 has a metacarpal portion 12, which for purposes of the invention is viewed as a fixed reference point. The finger has three main segments or portions, namely, a proximal segment 14, a middle segment 16, and a distal segment 18, terminating in a fingertip 20.

As conventionally viewed in the context of the distal portion 18 or fingertip 20, there are two general and quite distinct forms of motion which the finger is capable of. The first form of motion is referred to herein as a "push" motion, and is motion generally along the direction of the arrows P in FIG. 1. Push motion reflects, in large part, motion of the middle 16 and distal 18 segments moving together, and hence is herein also referred to as the distal function, about a pivot point 22. Motion about a pivot point 24 between the metacarpal portion 12 and the proximal segment 14 may also incidentally be involved. Typically, push motion is manifested by pressure of the fleshy portion 26 of the distal finger segment 18 against an object. However, in accordance with the invention it can be manifested in other ways. For example, the same motion can be sensed by directly sensing motion of the middle segment 16 with reference to the proximal segment 14.

The other and distinct finger motion with which the present invention is concerned is a thrust motion, generally along the direction of the arrows T in FIG. 1. Thrust motion reflects, in large part, motion of the proximal segment 14 with reference to the metacarpal portion 12 about the pivot point 24 (although accompanied by a compensatory pivot motion in the opposite direction about the pivot point 22), and hence is herein also referred to as the proximal function. Thrust motion is generally manifested by pressure of the fingertip 20 against an object. However, in accordance with the invention, it can be manifested in other ways. For example, the same motion can be sensed by pressure of the fleshy portion 28 of the proximal segment 14 against an object, or by directly sensing motion of the proximal segment 14 with reference to the metacarpal portion 12.

In summary, each finger represents two elements of the digital control function. The proximal segment of each finger can be controlled independently of the same finger's distal segment, or any other portion of the hand. There are of course four proximal functions on one hand. The distal or fingertip segment of the finger can be controlled independently of the proximal segment or any other portion of the hand. There are likewise four distal functions on one hand. In most persons, the middle segment 16 of the finger follows along with the distal segment 18; therefore, the middle segment 16 is viewed as part of the distal function.

These eight finger functions, along with the thumb, together can operate nine switch elements, to generate nine-bits of binary data, or eight-bits of data and a strobe.

For communication to the user, the elements of the digital communication function can have, associated with each element, finger pads which the user's brain can identify with that element. The sense of touch is employed, implemented for example by vibrators.

Figure 3:
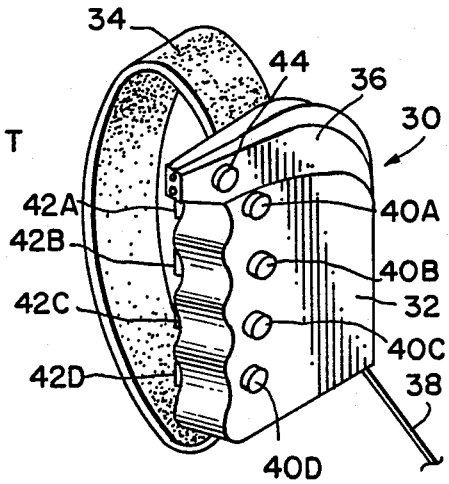
FIG. 3 is a front view of the hand-held device of FIG. 2, showing arrangement of switch actuators thereon.
Figure 2:
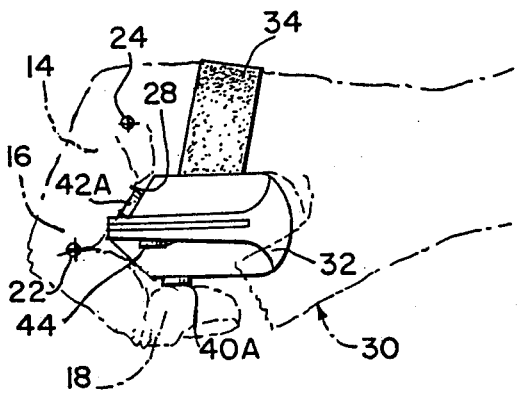
FIG. 2 is an end view of a hand-held communication device in accordance with a first embodiment of the invention, depicting the manner in which it is grasped and retained in the palm of the hand.
Figure 4:
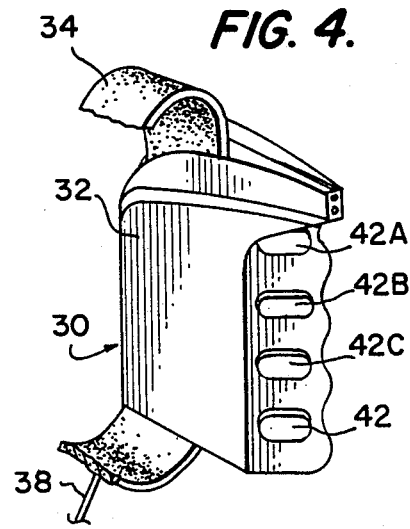
FIG. 4 is a view comparable to that of FIG. 3, but from a different orientation.

Referring now to FIGS. 2-4, a hand-held communication device 30 in accordance with the invention comprises a handlelike body 32, having a length generally corresponding to the width of a palm, and somewhat resembling a pistol grip. For retaining the body 32 against the palm of the hand, a suitable strap 34 is optionally provided. Thus, the device 30 is retained in proper position for operation while leaving the fingers essentially free. The body 32 is suitably contoured, and includes a thumbrest area 36. An electrical cable 38 connects circuitry within the body 32 to external devices. Shown in phantom in FIG. 2 is a representative finger of a person's hand curving around the contoured body 32, the finger having proximal 14, middle 16 and distal 18 segments as described above with reference to FIG. 1.

In the embodiment illustrated, eight pushbutton-type switch actuators are carried by the body 32. These include fingertip switch actuators 40A, 40B, 40C and 40D positioned for selective activation by distal portions 18 of the fingers as shown, and intermediate finger portion switch actuators 42A, 42B, 42C and 42D positioned for selective activation by the fleshy portions 28 of the proximal segments 14 of the fingers as shown. Preferably a thumb switch actuator 44 is also provided.

In order to enhance tactile response, particularly when the communication device 30 is employed for receiving signals, the intermediate finger portion switch actuators 42A-42D are somewhat elongated, thus increasing the area of contact.

Accordingly, it will be appreciated that an important aspect of the invention is this arrangement of switch actuators whereby two actuators can be operated by a single finger, and eight switch actuators can be activated in any desired combination, providing a full 8-bit binary code, with just one hand.

Figure 5:
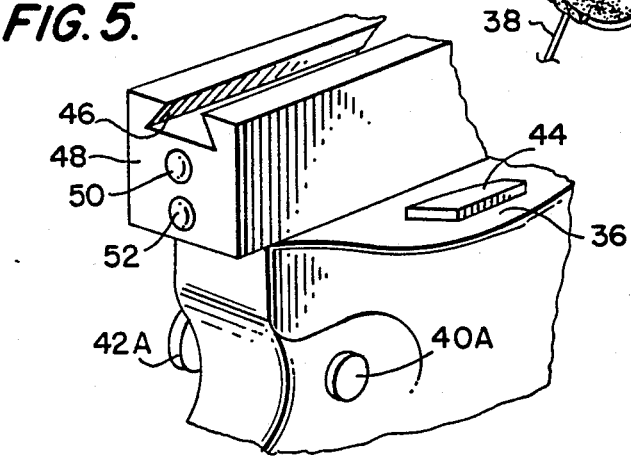
FIG. 5 is an enlarged view of a portion of the device of FIG. 1, specifically the nose end thereof, showing the attachment-retaining groove, as well as optical transmitter and receiver elements.

A feature of the device 30 of FIGS. 2-4 is its ability to accept attachments. As shown in the enlarged view of FIG. 5, a groove 46 of dovetail cross-section is provided along the upper edge of the body 32 to serve as an attachment-receiving fastening element. The body 32 has a nose portion 48 which supports elements of an optical transceiver comprising a base unit optical transmitter element 50, such as an LED, and a base unit optical receiver element 52, such as a suitable phototransistor. The transmitter element 50 is electrically connected to transmit signals from the switch actuators connected to the pushbuttons 40A-40D and 42A-42D, and the receiver element 52 is connected to operate the tactile stimulation elements, i.e. the vibrators, connected to the pushbuttons 40A-40D and 42A-42D in response to received signals.

Figure 6:
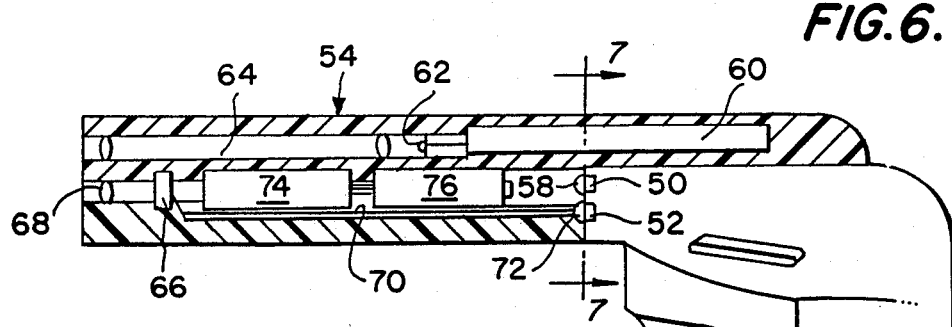
FIG. 6 depicts, partly in section, a pen-like projector/receiver module attached to the device of FIG. 2.
Figure 7:
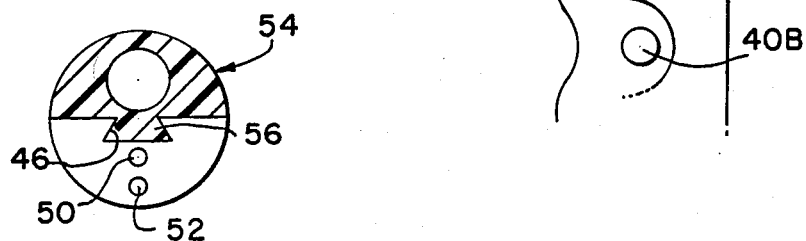
FIG. 7 is a view along line 7—7 of FIG. 6, partly in full and partly in section showing engagement of the dovetail groove.
Figure 8:
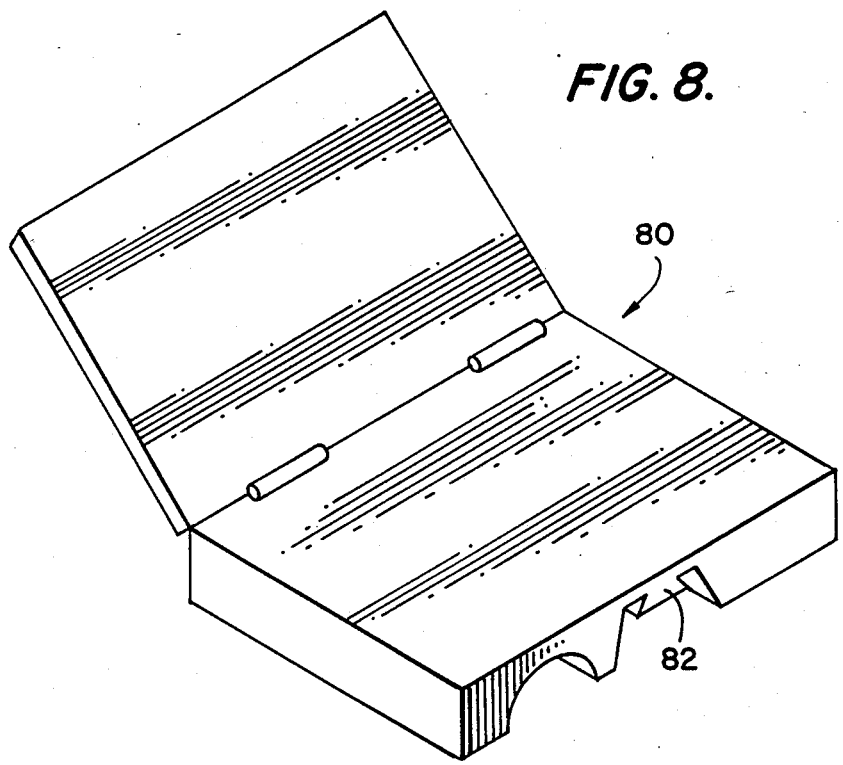
FIG. 8 is a perspective view of another attachment in accordance with the invention, adapted to be secured to the first embodiment, in the form of a display screen.
Figure 9:
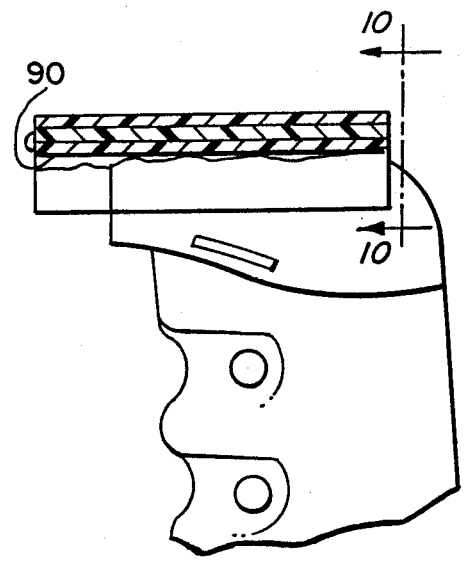
FIG. 9 is a side view, partially in section, showing the display device attachment of FIG. 8 in folded condition, but attached to the hand-held communication device of FIG. 2.
Figure 10:
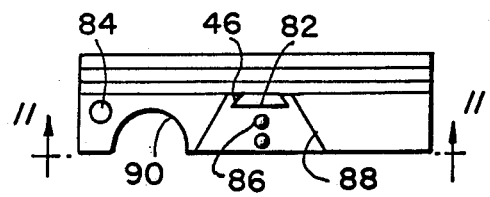
FIG. 10 is a front edge view, taken generally along line 10—10 of FIG. 9, but of the attachment only.
Figure 11:
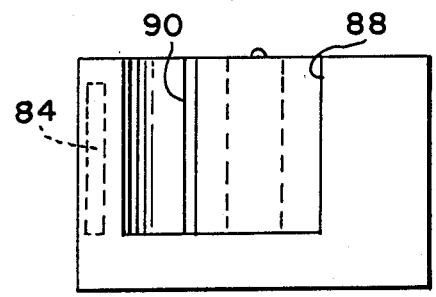
FIG. 11 is a bottom view, taken along line 11—11 of FIG. 10, of the display attachment device.

One form of attachment is depicted in FIGS. 6 and 7, and comprises an amplifying projector 54 physically attached to the body 32 by means of a rail 56 engaging the dovetailed groove 46, as is best seen in FIG. 7.

The amplifying projector 54 is generally pen-shaped, and has as an object to project remote control command to TV's, stereos, and the like. The device 50 may be equipped with a pocket clip (not shown) in the manner of an ordinary pen.

Internally, the amplifying projector 54 includes a photodetector 58 which receives signals from the base unit optical transmitter 50, and is connected to an amplifier circuit 60 which drives an LED 62. Light from the LED 62 is projected through an optional lens system 64, to emerge in amplified form.

The amplifying projector unit 54 may also be used to receive signals, and accordingly includes a photodetector 66 having its own lens 68, and which applies signals via a line 70, which may include an amplifier (not shown) to an LED 72 which communicates with the base unit optical receiver element 52. Contained within the amplifying projector device 54 are batteries 74 and 76 to power the amplifiers.

Another form of attachment is depicted in FIGS. 8-11, and comprises a display screen unit 80, similarly adapted to be attached to the body 32 by means of a rail 82 which, like the FIG. 7 rail 56, engages the dovetail slot 46.

The display screen device 80 resembles a folding compact case, and is about three by five and one-half inches square. When opened, it has two display screens, such as LCD screens, and contains its own battery 84 for power.

The display screen device 80 includes a photodetector element 86 which faces the base unit optical transmitter element 50, to receive representations of characters to be displayed.

The lower portion of the display screen unit 20 includes a groove 88 which fits over the top of the handle-like body 32, and another groove 90 which provides thumb clearance space.

Figure 12:
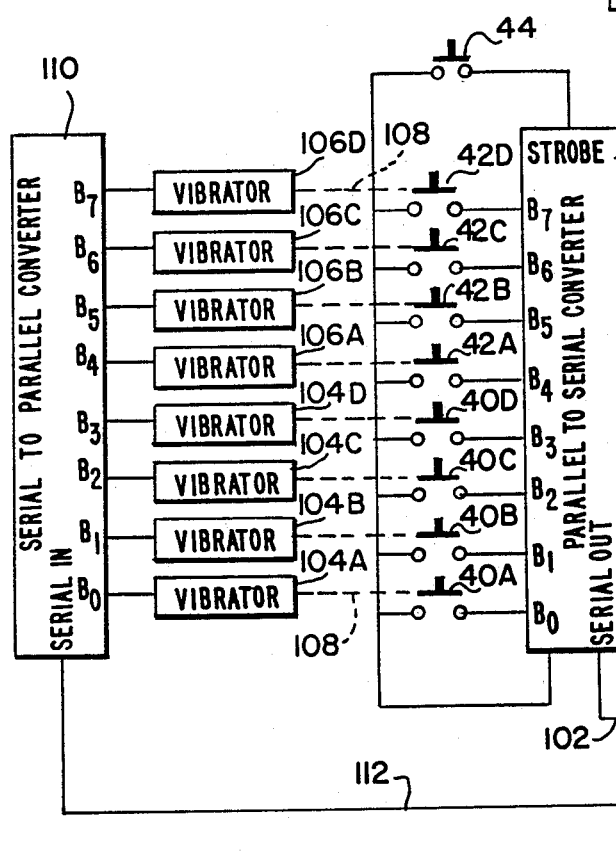
FIG. 12 is one form of electrical schematic circuit diagram which may be applied to the device of FIG. 2, depicting the electrical interconnection of various elements.

Referring now to FIG. 12, shown is an electrical schematic diagram of one form of circuitry which may be included within the embodiment of FIGS. 2-4. As may be seen in FIG. 12, the switch actuators 40A-40D and 42A-42D comprise elements of respective electrical switches connected to individual bit inputs $B_0$ through $B_7$ of a suitable interface circuit 100, shown for purposes of example as a parallel-to-serial converter. As is known, such a device comprises a parallel-in serial-out shift register which, when triggered, clocks out data as a serial bit stream along a serial output line 102. In FIG. 12, the thumb actuator 40 comprises a part of a switch connected to a STROBE input which triggers the serial output process.

The serial output line 102 may be connected to any one of a variety of devices, as is represented by the box 104. Thus, typical examples are a computer, a printer, a communications modem, another hand-held device, or other interface circuitry. Similarly, it will be appreciated that the parallel-to-serial converter 30 is representative only, and that other forms of interfaces may be employed, such as direct parallel interfaces.

When applied to the embodiments of FIGS. 5-11, the serial output line 102 of FIG. 12 is connected to drive the LED 50 comprising the base unit optical transmitter element.

Corresponding on a one-for-one basis to the switch actuators 40A-40D and 42A-42D are a plurality of tactile stimulation elements, shown as vibrators 104A-104D and 106A-106D, mechanically connected to the respective switch actuators as indicated by dash lines 108. The tactile stimulation elements typically comprise buzzers or mechanical "click" devices. Suitable tactile stimulation devices are currently employed in electronic devices for communication with the blind, such as the "Optacon" which employs vibrating pins for enabling the blind to read typewritten pages.

The vibrators 104A-104D and 106A-106D are selectively driven individually by a serial-to-parallel converter 110 which generally performs the converse operation of the parallel-to-serial converter 100. Thus, the serial-to-parallel converter 110 receives signals in the form of a serial bit stream along a line 112, and outputs parallel signals from its individual bit outputs $B_0$ to $B_7$.

The actual physical configuration is subject to wide variations, depending upon the particular application. For example, the FIG. 12 converters 100 and 110 may be included within the housing 32, in which event the conductors 102 and 112 are part of the cable 38. As another example, the converters 100 and 110, or other circuitry may be entirely external to the housing 32.

When applied to the embodiments of FIGS. 5-11, the serial input line 112 of FIG. 12 is supplied from the photosensors 52 comprising the base unit optical receiver element.

It is believed that the operation of the invention as thus far described will be better appreciated in view of the following TABLE I which depicts a portion of the seven-bit ASCII code commonly employed for data communications:

TABLE I

| Characters | $B_7$ | $B_6$ | $B_5$ | $B_4$ | $B_3$ | $B_2$ | $B_1$ | $B_0$ |
|---|---|---|---|---|---|---|---|---|
| SPACE | 0 | 0 | 1 | 0 | 0 | 0 | 0 | 0 |
| ! | 0 | 0 | 1 | 0 | 0 | 0 | 0 | 1 |
| " | 0 | 0 | 1 | 0 | 0 | 0 | 1 | 0 |
| # | 0 | 0 | 1 | 0 | 0 | 0 | 1 | 1 |
| 0 | 0 | 0 | 1 | 1 | 0 | 0 | 0 | 0 |
| 1 | 0 | 0 | 1 | 1 | 0 | 0 | 0 | 1 |
| 2 | 0 | 0 | 1 | 1 | 0 | 0 | 1 | 0 |
| 3 | 0 | 0 | 1 | 1 | 0 | 0 | 1 | 1 |
| 7 | 0 | 0 | 1 | 1 | 0 | 1 | 1 | 1 |
| 8 | 0 | 0 | 1 | 1 | 1 | 0 | 0 | 0 |
| 9 | 0 | 0 | 1 | 1 | 1 | 0 | 0 | 1 |
| A | 0 | 1 | 0 | 0 | 0 | 0 | 0 | 1 |
| B | 0 | 1 | 0 | 0 | 0 | 0 | 1 | 0 |
| C | 0 | 1 | 0 | 0 | 0 | 0 | 1 | 1 |
| D | 0 | 1 | 0 | 0 | 0 | 1 | 0 | 0 |
| L | 0 | 1 | 0 | 0 | 1 | 1 | 0 | 0 |
| M | 0 | 1 | 0 | 0 | 1 | 1 | 0 | 1 |
| N | 0 | 1 | 0 | 0 | 1 | 1 | 1 | 0 |
| W | 0 | 1 | 0 | 1 | 0 | 1 | 1 | 1 |
| X | 0 | 1 | 0 | 1 | 1 | 0 | 0 | 0 |
| Y | 0 | 1 | 0 | 1 | 1 | 0 | 0 | 1 |
| Z | 0 | 1 | 0 | 1 | 1 | 0 | 1 | 0 |

As depicted in the foregoing TABLE I, in accordance with the standard ASCII code, each character is encoded as a particular pattern of seven binary bits, $B_0$ being the low-order bit and $B_6$ being the high-order bit. The eighth bit $B_7$, is not defined in the standard ASCII code, but is available for special control purposes to suit particular applications. Thus, the standard ASCII code has a total of 128 characters defined (including control characters).

Those skilled in the art of data communications will appreciate that the foregoing TABLE I, for purposes of illustration, is an excerpt only of the standard ASCII code.

While the switch actuators 40A-40D and 42A-42D may be assigned to particular binaray bits $B_0$ through $B_7$ in any arbitrary manner desired, the following TABLE II depicts, for purposes of example, one such assignment which has been found to be suitable.

TABLE II

| Switch Assiqnments | | | | |
|---|---|---|---|---|
| Finger-Tip Switches: | 40D | 40C | 40B | 40A |
| Least Significant Bits: | $B_3$ | $B_2$ | $B_1$ | $B_0$ |
| Intermediate Switches: | 42D | 42C | 42B | 42A |
| Most Significant Bits: | $B_7$ | $B_6$ | $B_5$ | $B_4$ |

The operation of the invention as thus far described will now be considered in view of the foregoing TABLES I and II. For purposes of example, it will be assumed that the user intends to transmit the upper case letter L which, from TABLE I, has an ASCII bit pattern of 0100 1100. Thus, using the set of fingertip switches 40A-40D to select the least significant bits, the user operates finger-tip switches 40C and 40D. At the same time, using the set of intermediate finger portion switches 42A-42D, the user operates intermediate switch 42C. When the proper pattern is selected, the user actuates the thumb switch 44 to send the strobe signal.

The illustrated embodiment employs the thumb-switch as a manual strobe 44 since it works directly into a printer. An alternate approach is to use the NULL setting, all zeros or all fingers released, to automatically gate the information stored in registers to a computer. The registers, now cleared, are then ready for the next setting. This gives the keyboard an inherent command structure of 511 (corresponding to the binary value of 9 bits) while making the operation a bit smoother.

For receiving information, the tactile stimulation elements, such as the vibrators 104A–104D and 106A–106D are selectively activated based on an external signal, for example by buzzing or "clicking" such that they can be tactically sensed.

While the illustrated form of a one-hand unit 8 with eight coding switches plus a ninth (strobe) is quite adequate for most applications, it will be appreciated that more complicated arrangements may be employed. For example, two such units 8 may be employed by a single individual, one in each hand. Thus, patterns of sixteen bits can be generated, for a total of 65,536 different combinations.

Another approach is described hereinbelow with reference to FIGS. 14 and 15, where a switch having four levels of operation and a companion logic circuit are described.

Figure 13:
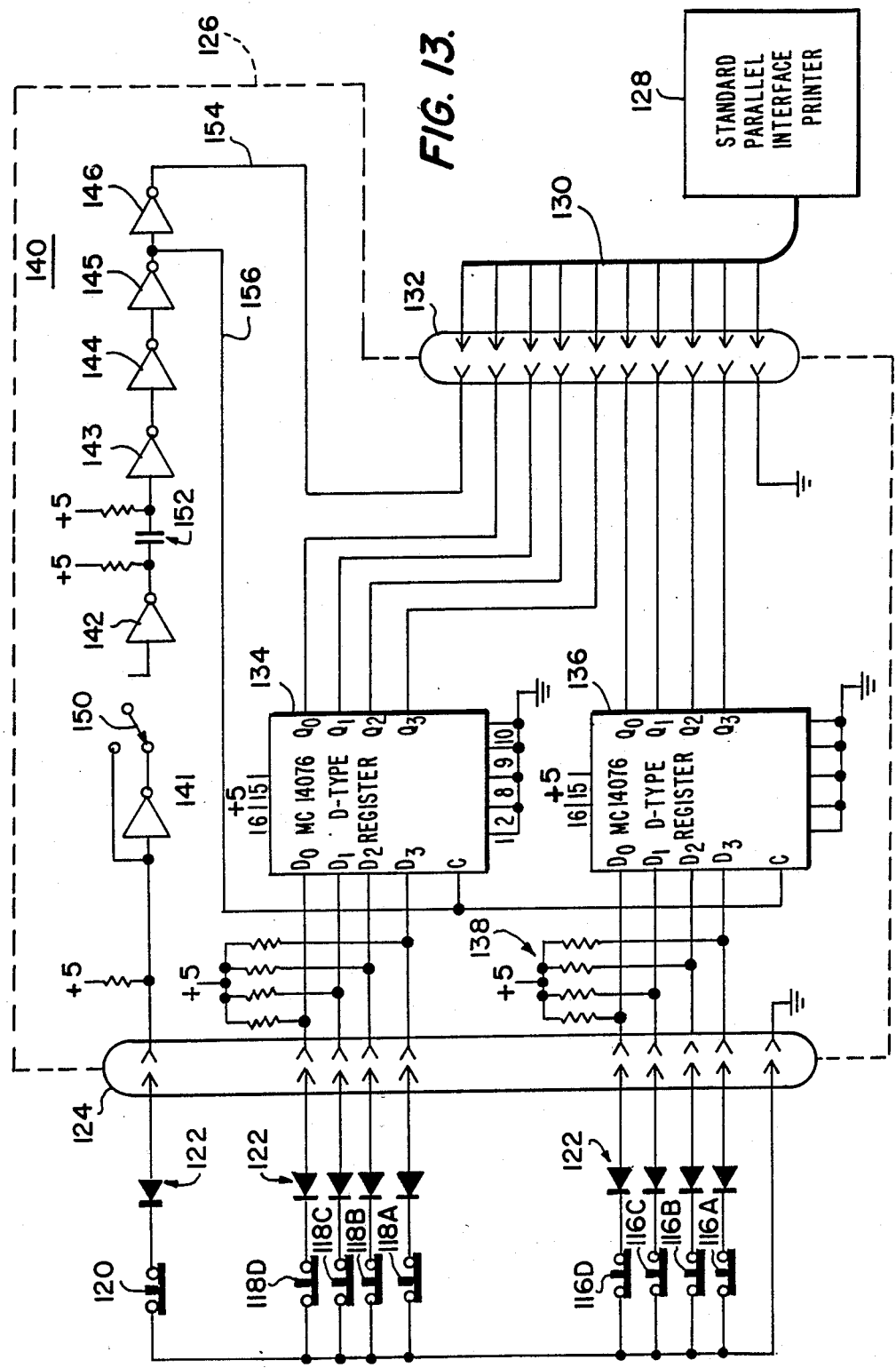
FIG. 13 is a modified form of electrical schematic circuit diagram.

Referring now to FIG. 13, depicted is another circuit suitable for use in the practice of the invention. In FIG. 13, a plurality of normally-closed distal finger segment pushbutton switches 116A–116D and intermediate finger portion switches 118A–118D are carried by a handle-like body such as the body 32 depicted in FIGS. 2–4. A normally-closed thumb switch 120 is also provided. All of these switches are electrically connected through a set 122 of isolation diodes and a suitable connector 124 to circuitry included within a separate housing 126.

As an output device, a standard parallel interface printer 128 is provided connected via a suitable cable 130 through another connector 132.

In essence, the circuitry within the housing 126 comprises an eight-bit parallel D-type latch which makes parallel data ready for the printer 128 when the strobe thumb switch 120 is actuated. Thus, there are provided a pair of four-bit D-type registers 134 and 136, which are standard integrated circuit devices, such as Motorola Type No. MC14076 low-power CMOS devices.

More particularly, the finger-tip switches 116A–116D and the intermediate finger portion switches 118A–118D are connected through the isolation diodes 122 to the data inputs $D_0$ through $D_3$ of the latch circuits 134 and 136 as indicated. Input pull-up resistors 138 are provided, which may comprise any suitable value such as 100 K ohm. While normally-closed switches are employed in FIG. 5, it will be appreciated that normally-open switches may equally be employed, with appropriate logic inversion.

The $Q_0$ through $Q_3$ outputs of the integrated circuit latches 134 and 136 are connected directly to appropriate pins of the output connector 132.

A strobe conditioning circuit, generally designated 140, comprises six integrated circuit inverters 141–146 connected generally in series. To enable selective reversal of the logic sense, a switch 150 is provided to selectively by-pass the first inverter 141. In order to produce a strobe pulse of predetermined duration regardless of how long the thumb strobe switch 120 is actuated, a suitable RC timing network 152 is connected between the inverters 142 and 143.

The output 154 of the strobe conditioning circuit 140 is connected to the printer 128 via the connector 132, while an intermediate output 156 is connected to the clock (C) inputs of the D-type registers 134 and 136.

In the operation of the circuit of FIG. 13, the user selects an appropriate combination of the switches 116A–116D and 118A–118D. When the appropriate combination has been selected, the thumb switch 120 is operated, which causes a pulse to be generated on the output lines 154 and 156.

The pulse on the line 156 connected to the clock (C) inputs of the latches 134 and 136 causes the data on the D inputs to be transferred to the Q outputs, where it remains stable until the next strobe pulse. At approximately the same time, the strobe output on the line 154 indicates to the printer 128 that valid, stable data is available.

With this circuit arrangement, it will be appreciated that various combinations of the switches 116A–116D and 118A–118D which may momentarily result while the proper combination is being selected have no effect on the output or operation, inasmuch as the data is not considered valid until the strobe switch 120 is actuated.

Figure 14:
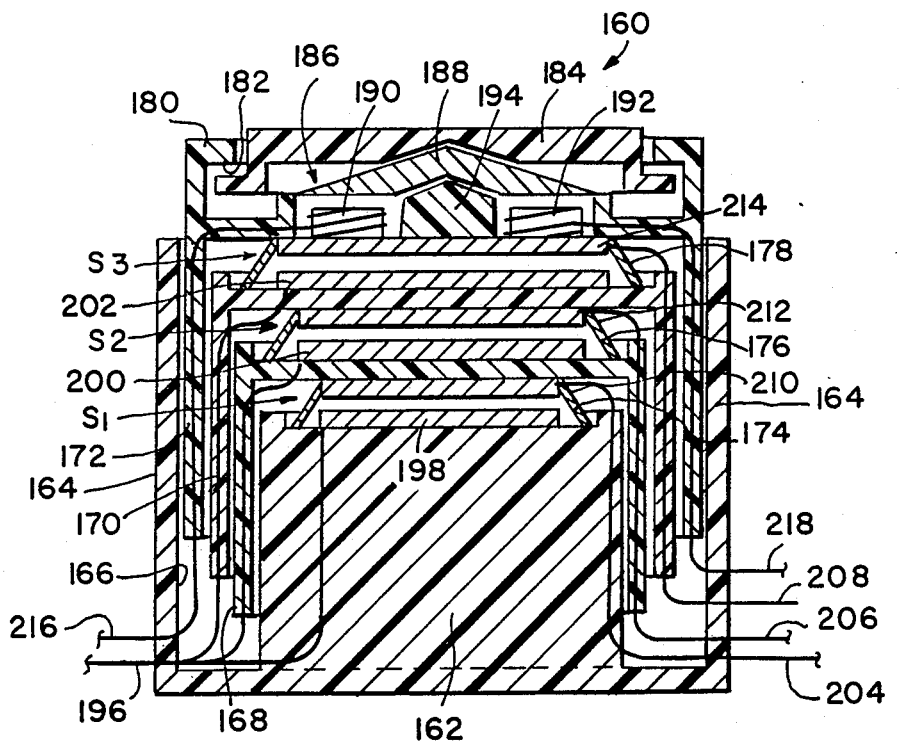
FIG. 14 is a cross-sectional view of an alternative form of pushbutton switch for use in the embodiment of FIGS. 2-4 which has four levels of operation, including a non-operated position.

With reference now to FIG. 14, shown in cross-section is an alternative form of switch 160 for use in the embodiment of FIGS. 2–6. The switch 160 has four levels of operation (including the non-operated position), and allows a great many more bit combinations to be generated compared to the simple two position switches described up to this point.

The switch 160 has three individual switch contact pairs S1, S2 and S3 which are operated by progressively increasing pressure. Briefly, starting from the non-operate position, light pressure causes the first contact pair S1 to make. Medium pressure causes the second contact pair S2 to additionally make. Finally, the heaviest pressure causes the third contact pair S3 to make, so all three contact pairs S1, S2 and S3 are made. It may be noted that the term "heaviest pressure" is not meant to imply a great physical force; the hand is rather pressure sensitive and, with snap or tactile switch feedback, the physical requirements are rather moderate.

With nine such switches operated by one hand, a multiple bit generator results, capable of generating several hundred thousand individual combinations. It is feasible to have each combination represent an individual word in the English language.

Preliminarily, it may be noted the switch 160 is described here as a round structure, as viewed from the top. Thus, terms such as "annular" are employed. However, it will be appreciated that the switch 160 may just as well be square when viewed from the top, and of box-like overall configuration.

Structurally, the switch 160 has an insulating base 162 having an integral upstanding outer wall 164 defining an annular groove 166 which serves as a guide for movable elements of the switch 160. Guided within the groove 166 are three nested shells 168, 170 and 172 held apart from each other and from the base 162 by sets of leaf springs 174, 176 and 178. As will be seen, the shells 168, 170 and 172 resemble tiny tin cans, each one larger than the next, and set over one another. The respective leaf spring sets 174, 176 and 178 are selected so as to be progressively stronger.

The outermost shell 172 has an extended portion 180 with a lip 182 which captures a button element 184, actually contacted by the user's fingers. For communication to the user, a buzzer assembly 186 is positioned immediately below the button element 184, the buzzer 186 comprising a ferromagnetic armature 188 and a pair of electromagnetic coils 190 and 192. To allow the armature 188 to vibrate regardless of pressure on the button element 184, a pointed stop element 194 integral with the outer shell 172 is provided in contact with the underside of the armature 188, which thus is enabled to rock under the influence of the electromagnetic coil 190 and 192 regardless of finger pressure applied.

Electrical connections to the switch pairs S1, S2 and S3 are depicted in highly diagrammatic form, as a variety of techniques may be employed, including employing the leaf springs 174, 176 and 178 as conductors, an arrangement which is not specifically shown.

A representative common switch contact lead 196, which may be connected to circuit ground, is electrically connected to lower contacts 198, 200 and 202 of the respective contact pairs S1, S2 and S3. Individual leads 204, 206 and 208 are respectively connected to upper contacts 210, 212 and 214 of the switch contact pairs S1, S2 and S3. Leads 216 and 218 are connected to supply the vibrator coils 190 and 192, which may be electrically connected in series.

Figure 15:
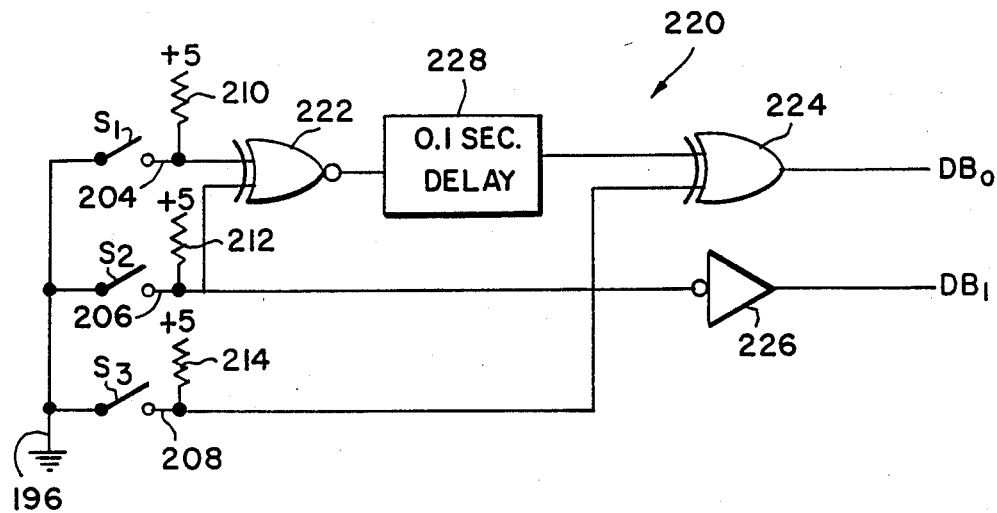
FIG. 15 is a logic schematic circuit diagram of a decoding circuit for use in conjunction with the switch construction of FIG. 14.

FIG. 15 is a logic diagram of one form of decoder circuit 220 for use in conjunction with the switch 160 of FIG. 14. The operation of the four level switch 160 and the decoder circuit 220 is depicted in the following TABLE III which relates finger pressure to switch closures, and to the state of a pair of output bits $DB_0$ and $DB_1$. It will be appreciated that output $DB_0$ is the low order bit of a binary pair, and $DB_1$ is the high order bit of a binary pair. The two binary bits $DB_O$ and $DB_1$ from each of the decoder circuits connected to the eight or nine pushbuttons in a single hand-held device can be combined in variety of manners, dependent upon the specific application. With four fingers and two switches per finger, a total of sixteen output bits in various combinations can be generated.

The FIG. 15 circuit 220 includes several digital logic elements, namely, an exclusive NOR gate 222, an exclusive OR gate 224 and an inverter 226. The common switch lead 196 is connected to circuit ground, and the switch leads 204, 206 and 208 are connected to inputs of the logic gates, as well as to individual pull-up resistors 210, 212 and 214 so that the gate inputs are at a logic high voltage (binary "1") when one of the switches are operated.

TABLE III

| Pressure | S1 | S2 | S3 | $DB_1$ | $DB_0$ |
|---|---|---|---|---|---|
| None | Open | Open | Open | 0 | 0 |
| Light | Closed | Open | Open | 0 | 1 |
| Medium | Closed | Closed | Open | 1 | 0 |
| Heavy | Closed | Closed | Closed | 1 | 1 |

From the table, it will be seen that output bit $DB_1$ is a binary "1" whenever switch S2 is closed. Accordingly, the output of switch S2 is simply connected through the inverter 226 to supply output $DB_1$.

For generating the output bit $DB_0$, the outputs of switches S1 and S2 are connected to inputs of exclusive NOR gate 222, which accordingly will have a logic low output when switch S1 alone is closed. In order to prevent a logic "glitch" on output $DB_0$ in the event finger pressure passes quickly through light pressure to medium pressure, a delay element 228 is connected between the output of exclusive NOR gate 222 and an input of exclusive OR gate 224. The delay element 228 comprises a conventional mono-stable multi-vibrator circuit, and functions to allow a logic low output from the exclusive NOR gate 222 to pass through only if the logic low output has a duration greater than a predetermined delay value, for example 0.1 seconds.

The delayed output of the exclusive NOR gate 222 and of the switch S3 are combined in the exclusive OR gate 222 which provides a logic high or binary "1" output for light or heavy pressure, but not medium pressure.

FIGS. 30-33 show an alternate pushbutton switch construction which has four levels of operation, including a non-operated position. The switch 400 is generally similar to the switch 160 of FIG. 14. Accordingly, the discussion of this switch 400 will emphasize differences between the two switches.

Figure 30:
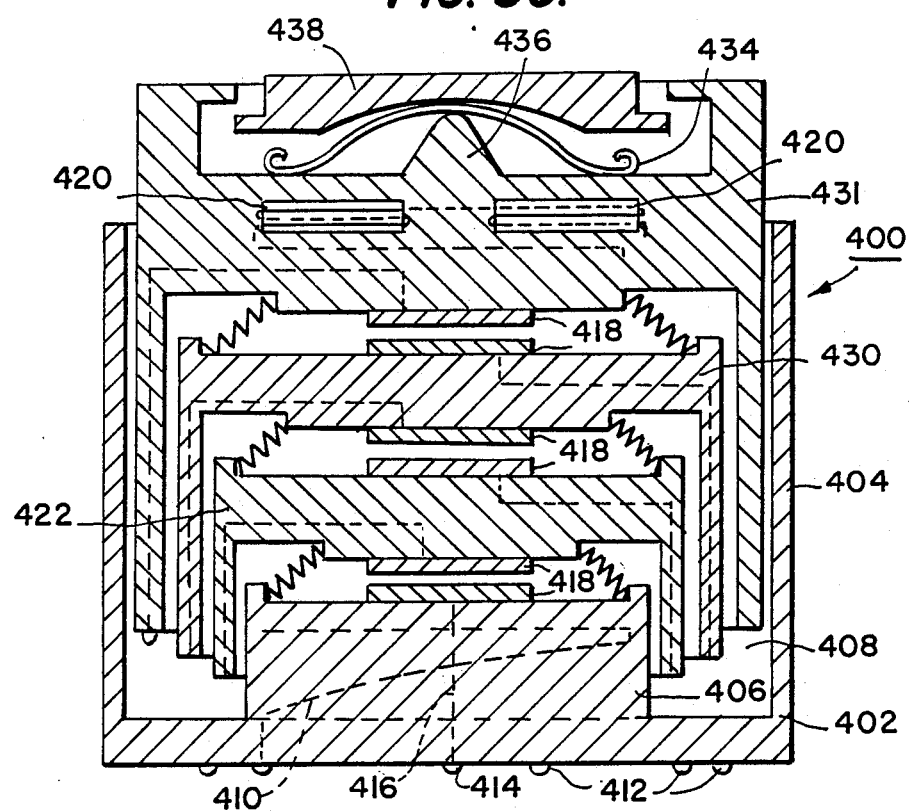
FIG. 30 shows a side cross-section of yet another alternate form of pushbutton switch for use in the embodiment of FIGS. 2-4.

The switch 400 includes an insulating base 402 having an outer wall 404 and a central portion 406. There is an annular space 408 between the central portion 406 and the outer wall 404. Seven leafsprings 410 are used to hold the switch 400 together and to conduct electricity. (For ease of illustration only one of the leafsprings 410 is shown in FIG. 30, but it should be appreciated with reference to FIG. 31 that each of the seven leafsprings 410 is disposed in the annular space 408.) As best shown in FIG. 32, each of the leafsprings 410 is riveted into the bottom of the annular space 408 to electrically connect to corresponding ones of seven terminals 412. A center terminal 414 is connected by conductor 416 connected to the lower most of the switch contacts 418.

Each of the leafsprings 410 extends in a partial circle around the center portion 406 of base 402. The leafsprings 410 are used to conduct electricity to the various contacts 418 and the two electromagnetic coils 420 which are wound in opposite directions so as to provide a "push-pull" operation. For simplicity, all of the wiring is not shown in FIG. 30.

Figure 32:
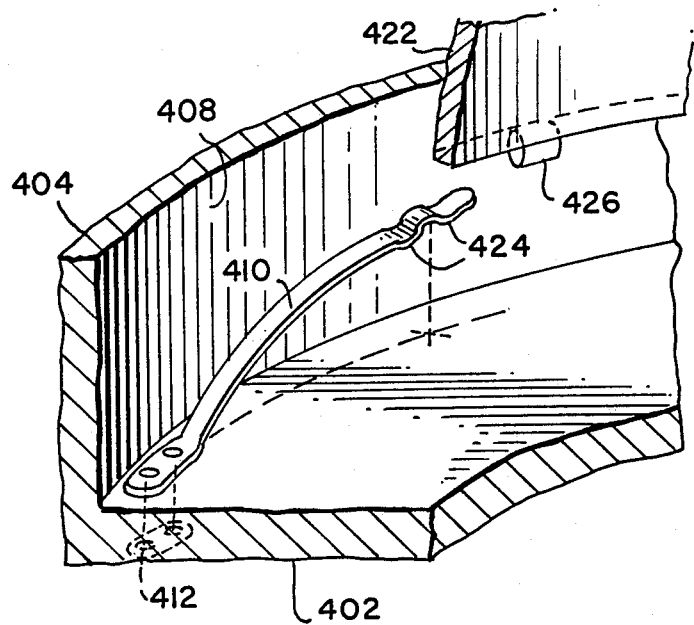
FIG. 32 shows a perspective view with parts broken away of a leafspring and associated parts which may be used in the switch of FIG. 30.
Figure 33:
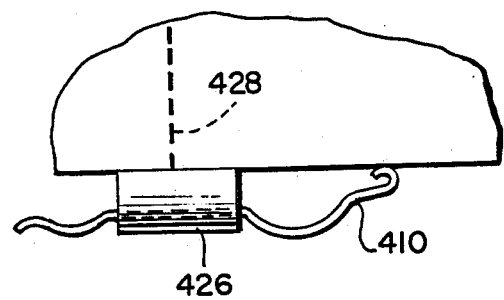
FIG. 33 shows an enlarged view of a portion of the spring of FIG. 32 and its mounting.

The switch 400 is assembled by using the base 402 with leafsprings 410 riveted thereto as a starting piece. The contact holder 422 is then placed over the central portion 406 and rotated such that the two dips 424 (FIGS. 32 and 33 only) hold the tip of the corresponding leafspring 410 to a corresponding holder 426 as shown in FIG. 33. A wire 428 may extend through the contact holder carrying the current from the corresponding leafspring 410 to the appropriate one of the contacts 418. The next outer contact holder may lock in place with the same mechanism shown in FIGS. 32 and 33 except that the direction of rotation of intermediate contact holder 430 should be opposite to that of the inner contact holder 422. The outer contact holder 432 would then be rotated in place with the opposite rotation from the intermediate contact holder 430.

Figure 31:
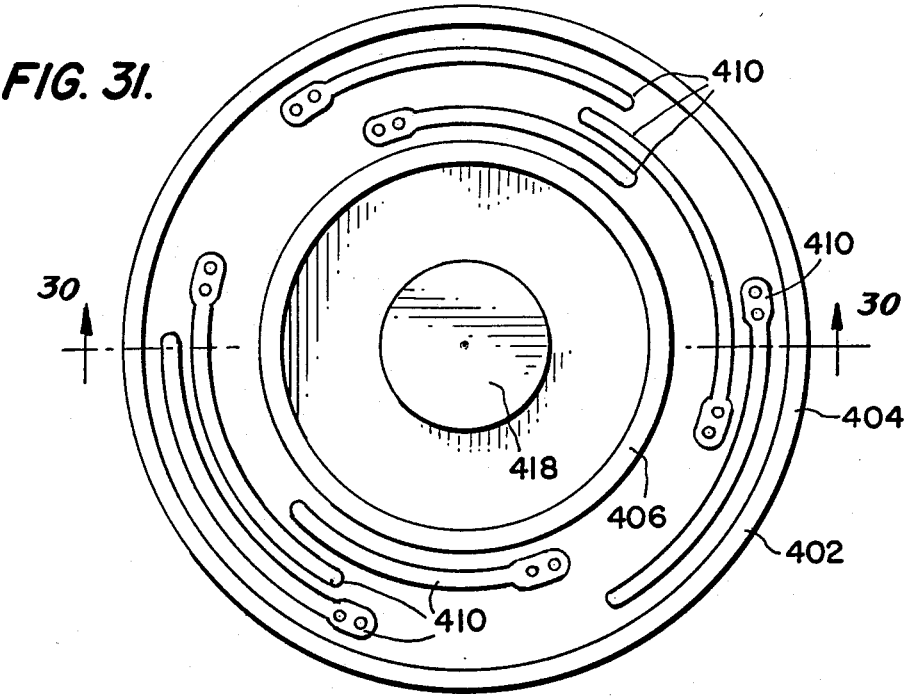
FIG. 31 shows a top view of a base portion of the switch of FIG. 30 and illustrates cross-section lines 30—30 corresponding to FIG. 30.

As will be appreciated by viewing FIGS. 30 and 31 together, there are two of the leafsprings 410 to hold the inner contact holder 422 in place and for electrical conduction to and from the two contacts 418 disposed upon that contact holder. In similar fashion, there are two intermediate leafsprings 410 performing the same functions with respect to the intermediate contact holder 430. There are three of the leafsprings 410 which perform the same function for the outer contact holder 432 except that one of these outer leafsprings conducts to the contact 418 mounted upon holder 432, and the other two outer leafsprings are used to supply electricity to the coils 420. For ease of illustration, FIG. 30 does not show all of the wires which are used to conduct from the holders such as 426 (FIGS. 32 and 33 only) to the corresponding contacts or coils of the contact holders.

The upper or outer contact holder 432 has a leafspring 434 above a stop 436. Above the leafspring 434 is a magnetic button element 438 which will vibrate upon actuation of the vibrator comprised of the coils 420.

As shown in FIG. 30, the base 402 and contact holders 422, 430 and 432 are separated by pieces 440 of rubber snap material, which pieces are thicker as you go up such that the lower contacts make first, intermediate contacts make second and upper contacts make last.

With reference now to FIGS. 16–20, depicted is a second overall embodiment of a finger movement actuated communication device 240 in accordance with the invention. The device 240 employs the same overall finger motions as does the first overall embodiment described above, but requires only a single switch actuator per finge. Each actuator responds to two distinct motions, pushing and sliding. The switch actuators are contacted and operated by the fleshy part 26 (FIG. 1) of the distal portion of the fingers.

The device 240 is relatively thin, and somewhat resembles a credit card. A control surface 242 is positioned so as to be contacted by the fleshy portions of the user's fingertips, and carries four switch actuators 244, 246, 248 and 250 for fingertip actuation. A thumb switch actuator 252 is provided, together with an LED output element 254. As shown in FIG. 16, the LED output element 254 can be employed to communicate to any receiving device, represented by box 256 having an optical receiver element 258. Typically, a receiving device 256 comprises a bank teller machine, a telephone, or the like.

As noted above, each of the switch actuators 244, 246, 248 and 250 responds to two separate motions, pushing and sliding.

Considering switch actuator 244 by way of example, with reference to FIG. 20, pushing the switch actuator 244 operates a switch element 260, which operates binary bit 0. Thus, when the switch actuator is pushed, a binary "1" is output in this bit position. Relating this pushing motion to the finger motions previously described, it will be appreciated that pushing of the switch actuator 244 results in motion in a direction generally perpendicular to the control surface 242, and represents push motion (i.e. the distal function) of the finger, as described hereinabove with reference to FIG. 1.

Sliding motion of the switch actuator 244, that is motion in a direction generally perpendicular to the control surface 242, operates a switch element 262 in response to thrust motion (proximal function) of the finger, as described hereinabove with reference to FIG. 1.

Figure 21:
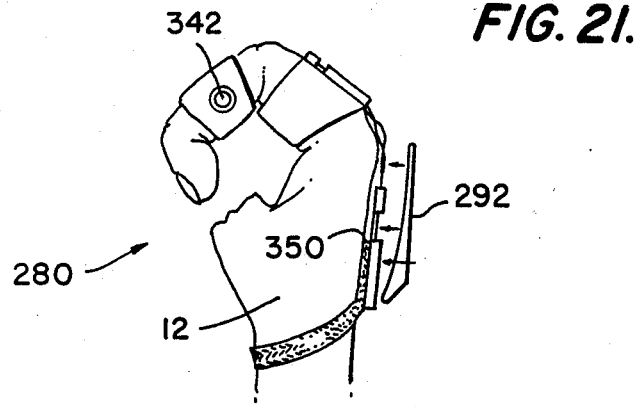
FIG. 21 is a side view of a third embodiment of the invention, worn on a person's hand.
Figure 22:
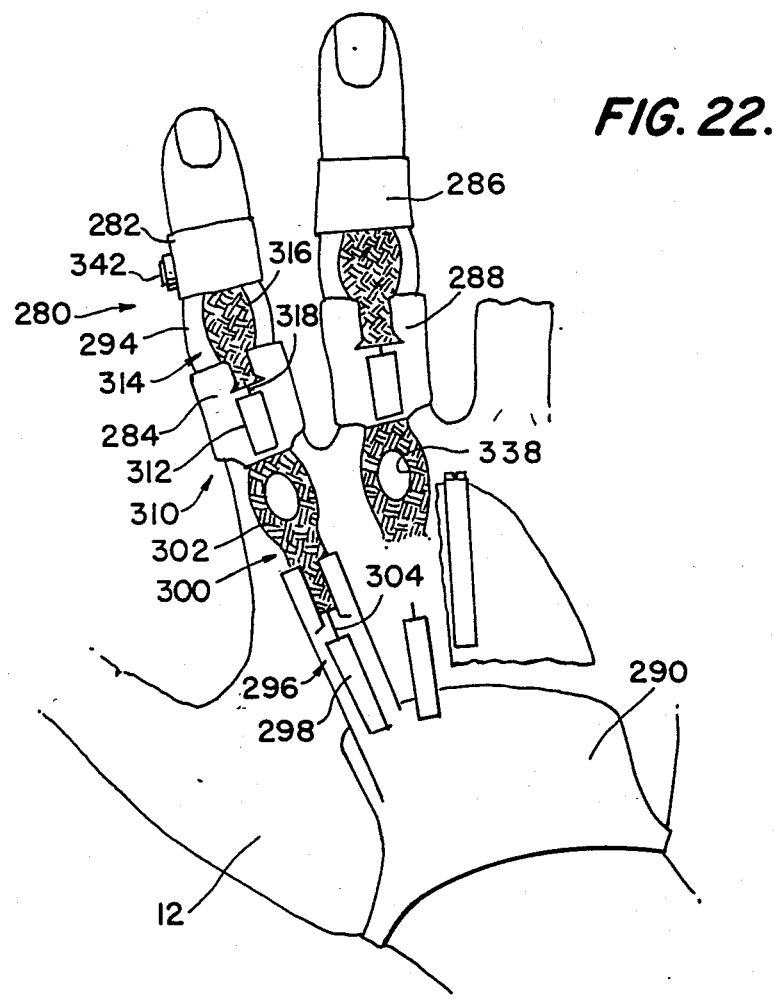
FIG. 22 is a top view of the FIG. 21 device, with the user's fingers extended.

Referring to FIGS. 21 and 22, shown are overall views of a third and final embodiment of a finger movement actuated communication device 280 in accordance with the invention, individually responsive to thrust and push motions of the fingers of a person's hand with reference to the metacarpal portion 12. Certain details of the device 280 are shown in FIGS. 23–29.

The device 280 includes a set of collar-like attachment members, such as the representative collar-like attachment members 282, 284, 286 and 288 adapted to be secured to the proximal 14 and middle 16 segments (FIG. 1) of the fingers so as to follow the motions thereof. More specifically, the representative collar-like attachment members 284 and 288 are termed herein first collar-like attachment members, and are secured to the proximal finger segment 14 so as to follow the motion thereof. The representative collar-like attachment members 282 and 286 are referred to herein as second collar-like attachment members and are secured to a segment of the finger beyond the proximal segment 14 (i.e. to either the middle 16 or distal 18 segment, since the two segments ordinarily move together) so as to follow motion of the middle segment 16 of the finger.

Metacarpal reference attachment member 290 is adapted to be secured to the back of the hand, as a wrist harnass somewhat like archers use. As depicted in FIG. 21, an optical projector and mechanism-shielding attachment 292 may optionally be secured to the metacarpal reference attachment member 290. It will be appreciated that all of the attachment approaches described hereinabove with reference to FIGS. 5–10 are equally applicable to this embodiment, including the provision of an LED amplifying projector.

Figure 29:
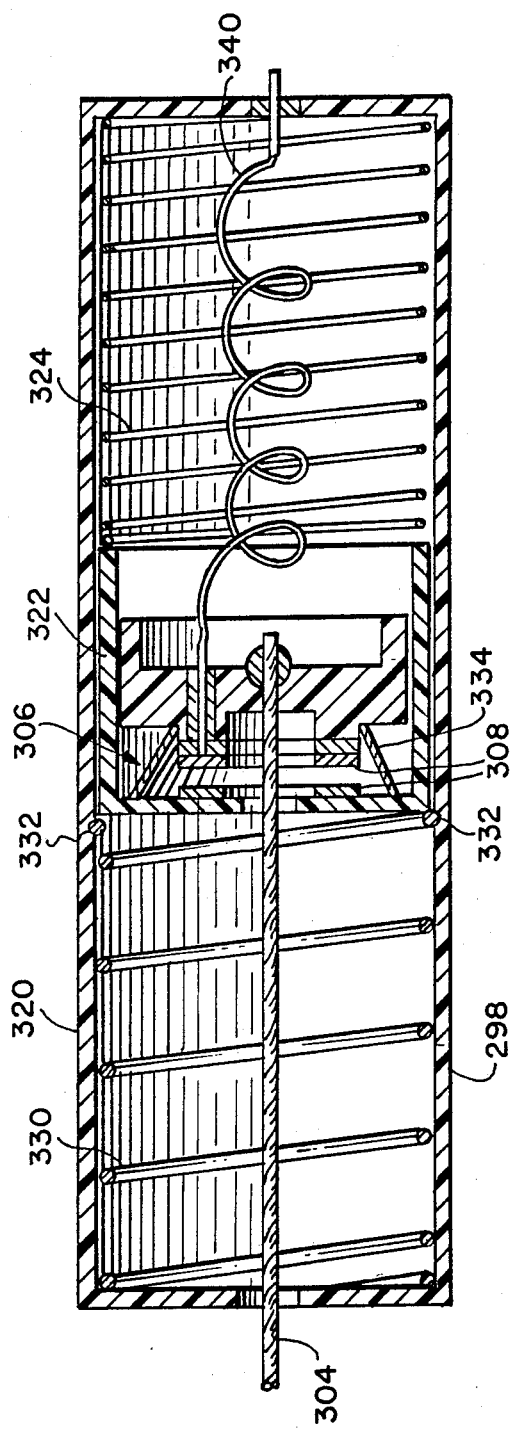
FIG. 29 is an enlarged cross-sectional internal view of one of the switch elements in the embodiment FIGS. 21 and 22.

By way of example and with reference to the depicted index finger 294, for sensing thrust motions as described hereinabove with reference to FIG. 1, a first extendable switch assembly 296 is provided mechanically linking the metacarpal reference attachment member 290 and the first collar-like attachment member 284 such that the first extendable switch assembly 296 lengthens and shortens as the proximal finger segment 16 moves with reference to the metacarpal portion 12 of the hand in a thrust motion, accompanied by pivoting about the point 24 (FIG. 1). The first extendable switch assembly 296 includes a switch housing 298 and a flexible link 300 extending from the switch housing 298. The flexible link 300 more particularly comprises a ribbon cable portion 302 and a relatively small diameter cord portion 304. Within the switch housing 298 is a first switch element, a representative internal construction of which is shown in FIG. 29 as switch 306.

The first switch element, such as the representative switch element 306, has two states, namely, a closed state when the first extendable switch assembly 296 is lengthened and switch contacts 308 close, and an open state when the first extendable switch assembly 296 is shortened, allowing the contacts 308 to open.

In order to sense push motions as described hereinabove with reference to FIG. 1, a second extendable switch assembly generally designated 310 is provided mechanically linking the first 284 and second 282 collar-like attachment members such that the second extendable switch assembly 310 lengthens and shortens as the middle finger segment 16 pivotally moves with reference to the proximal segment 14 in a push motion. The second extendable switch assembly 310 similarly includes a second switch element (constructed like the exemplary switch element of FIG. 29) contained within a switch housing 312, and having a flexible link 314 comprising a ribbon cable portion 316 and a cord portion 318.

With reference now in particular to FIGS. 23–29, various details of the device will now be described.

Considering in particular the representative FIG. 29 switch assembly, the switch generally comprises a cylinder or tube 320 with a piston-like element 322 sliding within it. A spring 324 at the back of the switch serves as a retaining spring, having as its purpose to keep the various elements in place, especially when the piston 322 is between a "set" position illustrated and a "slack" position where the piston 322 would be positioned farther to the right. For adjustment purposes, the cord 304 extending from the FIG. 29 switch assembly passes through an aperture 326 (FIG. 26) on an adjustment block 328, with a suitable clamping device (not shown)

associated with the aperture 326. For adjustment purposes, the hand is placed in a relaxed position, and the cord 304 pulled through the aperture 326 until the FIG. 29 switch piston 32 reaches the "set" position illustrated.

The FIG. 29 switch includes a relatively stronger spring 330, and at the "set" position the piston 322 just contacts the stronger spring 330. The relatively stronger spring 330 has greater force, but nevertheless does not prevent the hand from closing. To provide a detent, an annular groove 332 is formed in the wall 320.

During operation, as the fingers close and the respective extensible switch assemblies are lengthened, the cord 304 is pulled to the left, out of the FIG. 29 switch assembly. Initially, the movement causes the switch 306 contacts to close. To provide tactile feedback, switch contact springs 334 are provided which can be suitably, as is known in the art, to provide a "snap" feel to the switch. After the contacts are closed, further motion is accomodated in a lost motion arrangement, by compression of the spring 330, as will be appreciated.

As shown in FIG. 29, the conductor 340 comes in at right center of the drawing and, by way of its coils expanding, follows the switch. It is shown with insulation at both ends and touches contacts 308 at their right side. It should be noted that the contacts rest on an insulated base as the left side contacts 308 conduct through the body of the switch to ground. It should also be noted that the cable 304 passes through a hole in piston 322.

Figure 27:
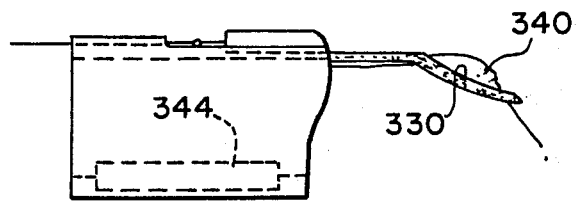
Figure 28:
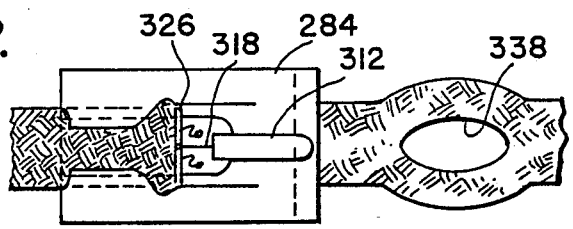

Various other constructional details add sufficient stiffness to the assembly in order to keep the various elements in position. Representative first collar-like attachment member 284 is shown enlarged in FIGS. 25-28. In FIG. 28, it will be seen that the switch housing 312 is attached near the rear of the collar-like member 284 with the cord 318 projecting out and connected to the adjustment block 328 as described above with reference to FIG. 26. The ribbon cable portion 302 slides under a pair of flanges 336. Representative electrical conductors 338 are depicted. The ribbon cables 302 serve the dual purposes of transmitting motion, and carrying electric signals, and the electrical connections 338 serve to carry electrical signals from one ribbon cable to the next. To further secure the assembly, apertures 338 are provided, through which knuckles 340 project, as is best seen in FIGS. 27 and 28.

A thumb switch 342 (FIG. 22) is provided, carried by the second collar-like attachment member on the forefinger. From FIG. 21 in particular, it will be appreciated that the button 342 is positioned for activation by the thumb.

Figure 23:
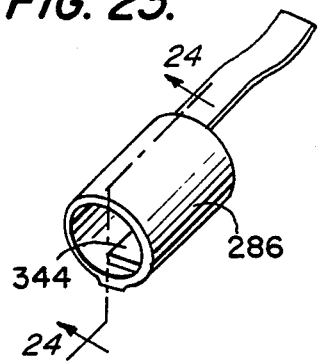
FIG. 23 is a perspective view of a collar-like ring employed in the embodiment of FIGS. 21 and 22, depicting a vibrator inside.
Figure 24:
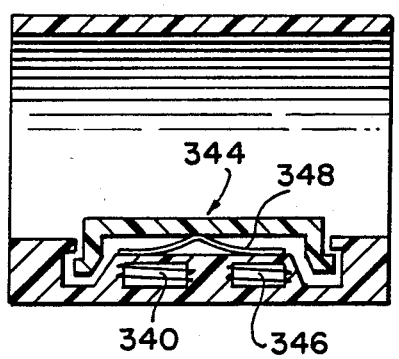
FIG. 24 is an enlarged section of the ring of FIG. 23.
Figure 25:
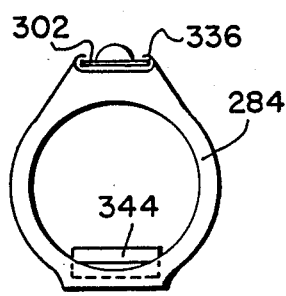
FIGS. 25, 26, 27 and 28 are various views of a lost motion linkage in accordance with the invention.
Figure 26:
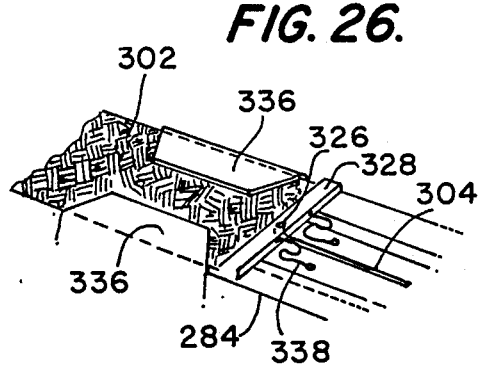

Selectively controlled tactile stimulation elements, such as a representative FIG. 24 vibrator 344 are provided within each of the collar-like attachment members. The vibrator 344 includes a pair of electromagnetic coils 346 operating an armature 348. FIG. 23 depicts the manner in which a vibrator is positioned within a representative one 286 of the second collar-like attachment members, and FIGS. 25 and 27 depict the manner in which a vibrator is placed within a representative first collar-like attachment member 284.

To mention several other constructional details, in FIG. 21 a gap 350 will be seen where the wrist harnass lifts the switch assemblies slightly away from the back of the hand, in order to minimize skin contact and attendant chafing. It will be further appreciated when the operation of the embodiment depicted is considered, that in general the skin on the back of the hand and across the knuckles move with the motion of the fingers, and the switch to ribbon arrangements are such as to allow the cable to move with the skin, minimizing chafing.

While the illustrated embodiment of FIGS. 21-29 depicts mechanical linkages between the attachment member 290 and the various collar-like attachment members, it will be appreciated that the invention is not so limited. In particular, the essential thing that is required is the sensing of relative movement between the metacarpal portion of the hand and the proximal segments, and between the proximal segments and the intermediate segments. Various other forms of coupling may be employed to accomplish this purpose, such as electromagnetic or optical coupling. By way of example, an embodiment of the invention may be constructed comprising ordinary looking rings electromagnetically coupled to an ordinary looking bracelet, all of which could be worn inside a glove with minimal interference.

While specific embodiments of the invention have been illustrated and described herein, it is realized that numerous modifications and changes will occur to those skilled in the art. It is therefore to be understood that the appended claims are intended to cover all such modifications and changes which fall within the true spirit and scope of the invention.

What is claimed is:

1. A finger movement actuated communication device individually responsive to thrust and push motions of at least one finger of a person's hand with reference to the metacarpal portion of the hand, said device comprising:

a metacarpal reference attachment member adapted to be secured to the back of the hand;

a first collar-like attachment member adapted to be secured to the proximal segment of the one finger so as to follow motion of the proximal segment;

a second collar-like attachment member adapted to be secured to a segment of the one finger beyond the proximal segment so as to follow motion of the middle segment of the one finger;

a first extendable switch assembly mechanically linking said metacarpal reference and said first collar-like attachment members such that said first extendable switch assembly lengthens and shortens as the proximal finger segment pivotally moves with reference to the metacarpal portion of the hand in a thrust motion, said first extendable switch assembly including a first switch element having two states, said first switch element being in one of its states when said first extendable switch assembly is lengthened and in the other of its states when said first extendable switch assembly is shortened; and a second extendable switch assembly mechanically linking said first and second collar-like attachment members such that said second extendable switch assembly lengthens and shortens as the middle finger segment pivotally moves with reference to the proximal finger segment in a push motion, said second extendable switch assembly including a second switch element having two states, said second switch element being in one of its states when said second extendable switch assembly is lengthened and in the other of its states when said second extendable switch assembly is shortened;

whereby said first switch element responds to thrust motions of the finger and said second switch element responds to push motions of the finger.

2. A communication device in accordance with claim 1, which includes four sets of first and second collar-like attachment members and first and second extendable switch assemblies, one set for each finger, thereby providing eight switches which can be selectively operated by one hand in predetermined combinations.

3. A communication device in accordance with claim 2, wherein one of said second collar-like attachment members is adapted to be secured to a segment of the forefinger of the person's hand and carries a switch actuator positioned for activation by a thumb.

4. A finger movement actuated communication device in accordance with claim 1, which includes selectively controlled tactile stimulation elements within said collar-like attachment members to enable communication to the operator of said communication device.

5. A finger movement actuated communication device in accordance with claim 4, wherein said tactile stimulation elements comprise vibrators.

* * * * *